United States Patent
Rodriguez et al.

(10) Patent No.: US 7,876,814 B2
(45) Date of Patent: Jan. 25, 2011

(54) MODEM CARD CONFIGURED TO COMPENSATE FOR POWER SUPPLY

(75) Inventors: Romeo Hernandez Rodriguez, San Diego, CA (US); Kotaro Matsuo, Poway, CA (US); Aydin Nergis, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 1007 days.

(21) Appl. No.: 11/678,476

(22) Filed: Feb. 23, 2007

(65) Prior Publication Data

US 2008/0209242 A1    Aug. 28, 2008

(51) Int. Cl.
H04B 1/38    (2006.01)

(52) U.S. Cl. .................... 375/222; 455/127.1; 455/558; 455/572

(58) Field of Classification Search ................. 375/219, 375/222, 295, 297; 713/300, 320; 455/127.1, 455/127.5, 558, 572, 574

See application file for complete search history.

(56) References Cited

U.S. PATENT DOCUMENTS

| | | | |
|---|---|---|---|
| 5,634,132 A | 5/1997 | Pearce et al. | |
| 6,169,884 B1 | 1/2001 | Funk | |
| 6,985,757 B2 * | 1/2006 | Liu et al. | 455/558 |
| 7,106,569 B2 * | 9/2006 | Liu et al. | 361/93.1 |
| 7,278,033 B2 * | 10/2007 | Mylly | 713/300 |
| 2004/0204181 A1 | 10/2004 | Cromer et al. | |

FOREIGN PATENT DOCUMENTS

WO    WO 2006/011555    2/2006

* cited by examiner

Primary Examiner—David B Lugo

(57) ABSTRACT

A modem card includes a connector configured to be detachably connected to a computer. The card also includes electronics configured to be powered by a power supply located in the computer and to transmit wireless signals to a communications network at a transmit power. The electronics are configured to vary the transmit power such that the transmit power does not exceed a maximum transmit power. Increases in the transmit power cause a drop in the voltage of the power. The electronics are also configured to determine an adjusted maximum transmit power. The adjusted maximum transmit power is a transmit power at which the signals can be transmitted to the communications system without the voltage dropping below a shut-down voltage. The electronics are also configured to reduce the value of the maximum transmit power to a value that that is less than or equal to the value for the adjusted maximum transmit power.

20 Claims, 3 Drawing Sheets

US 7,876,814 B2

MODEM CARD CONFIGURED TO COMPENSATE FOR POWER SUPPLY

TECHNICAL FIELD

The present invention relates to computer peripheral devices and more particularly to modem cards.

BACKGROUND

Modem cards allow a computer to wirelessly communicate with a communications system. During operation of the modem card, the modem card transmits wireless signals to the communications system. In some instances, the communications system requests that the PC card increase the transmit power of the signals. The modem card can increase the transmit power up to a maximum transmit power. The maximum transmit power is generally set by the manufacturer of the modem card.

Modem cards are powered by a power supply located in the computer to which the modem card is connected. Increasing the transmit power of the modem card increases the current draw from the modem card. As a result, the increased transmit power can cause a drop in the voltage of the power being supplied to the modem card by the computer (supplied voltage).

Different computer manufacturers use different power supplies. As a result, increasing the transmit power to the maximum transmit power causes the supplied voltage to drop to different levels in different computers. In some computers, the supplied voltage can drop below a shut-down voltage where the computer shuts down the computer or the modem card. As a result, there is a need for modem cards that compensate for variation in the power supplies used in different computers.

SUMMARY

A modem card includes a connector configured to be detachably connected to a computer. The modem card also includes electronics configured to be powered by a power supply located in the computer. The electronics are configured to transmit wireless signals to a communication network at a transmit power level. The electronics are configured to vary the transmit power such that the transmit power does not exceed a maximum transmit power. Increases in the transmit power cause a drop in the voltage of the power supplied to the modem card. The electronics are also configured to determine an adjusted maximum transmit power. The adjusted maximum transmit power is a transmit power at which the signals can be transmitted to the communications system without the voltage dropping below a shut-down voltage. The electronics are also configured to reduce the value of the maximum transmit power to a value that that is less than or equal to the value for the adjusted maximum transmit power.

DETAILED DESCRIPTION

A modem card is configured to be detachably connected to a computer. When the modem card is connected to the computer, a power supply in the computer provides power to the modem card (supplied power). The supplied power powers the operation of electronics in the modem card. The electronics employ the supplied power to transmit wireless signals to a communications system. The modem card can vary the transmit power of the signals up to a maximum transmit power. Increasing the transmit power reduces the voltage of the supplied power. The modem card determines an adjusted maximum transmit power. The adjusted maximum transmit power is a transmit power at which the signals can be transmitted to the communications system without the voltage of the supplied power dropping below a shut-down voltage. The modem card changes the value of the maximum transmit power from a set maximum transmit power to a value that is at most equal to the value of the adjusted maximum transmit power. As a result, the modem card transmits signals using a maximum transmit power that is less than or equal to the adjusted maximum transmit power. Accordingly, the electronics can increase the transmit power to the maximum transmit power without the voltage of the supplied power dropping below a shut-down voltage.

The modem card can determine a different adjusted maximum transmit power for different power supplies and accordingly for different computers. As a result, the ability of the modem card to increase the transmit power to the maximum transmit power without the voltage of the supplied power dropping below the shut-down voltage is independent of the computer being employed.

Figure 1:
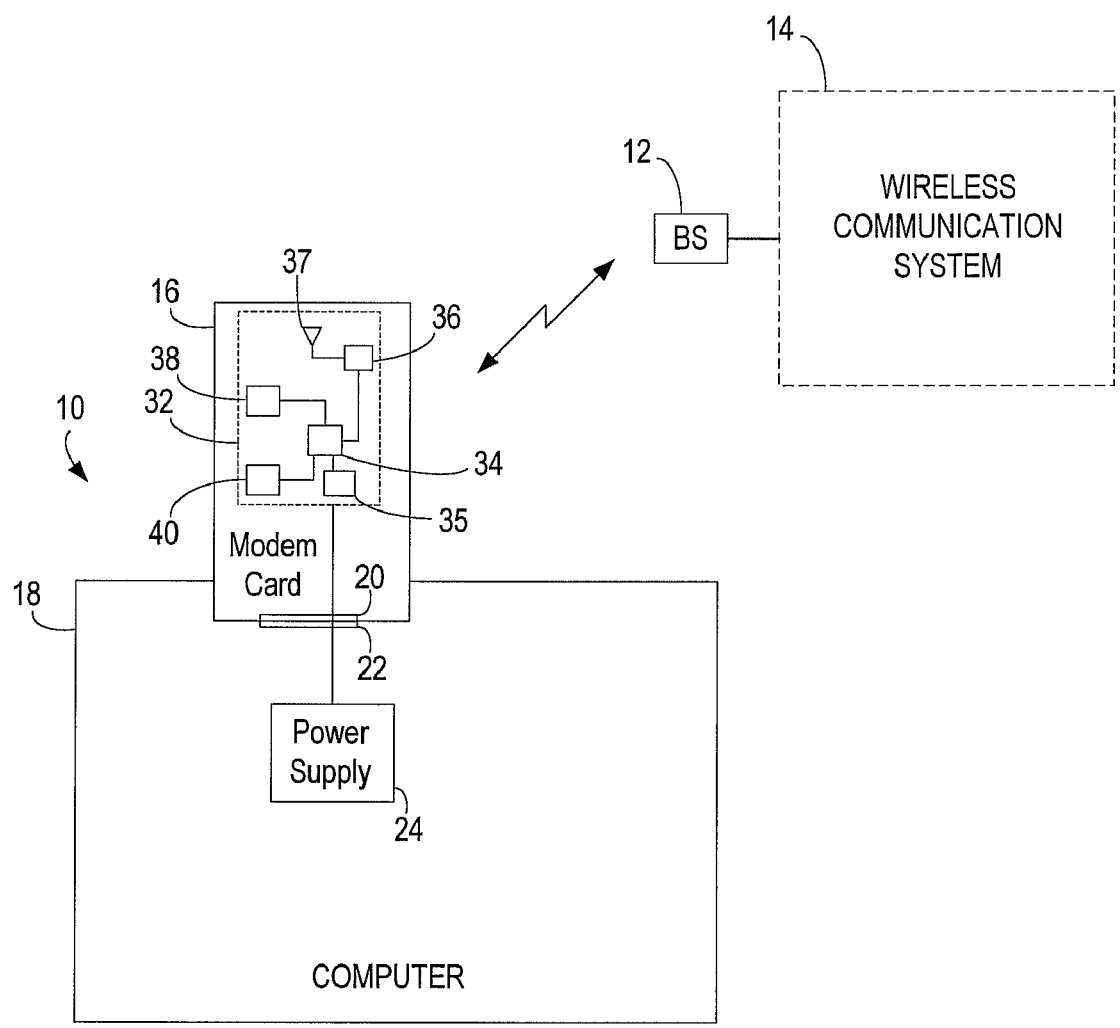
FIG. 1 illustrates a computer system configured to transmit wireless signals to a communications system. The computer system includes a modem card connected to a computer such that the computer provides power to electronics in the modem card.

FIG. 1 illustrates a computer system 10 in wireless communication with the base station 12 of a wireless communications system 14. The computer system 10 includes a modem card 16 in communication with a computer 18. The modem card 16 enables the computer 18 to wirelessly communicate with the wireless communications system 14 over a wireless air-link. Examples of suitable wireless communications systems 14 include, but are not limited to, code-division multiple access (CDMA) based networks. Suitable computers 18 include laptop computers and notebook computers but can also include other computers 18 that employ modem cards 16 to communicate with wireless communication systems such as game systems and office equipment. Suitable modem cards 16 includes, but are not limited to, Personal Computer 18 Memory Card International Association (PCMCIA cards or PC cards) having wireless modem capabilities, Express Cards having wireless modem capabilities, Miniature Cards (Mini Cards) having wireless modem capabilities, and Express Mini Cards or Mini Express Cards having wireless modem capabilities.

The modem card 16 includes a connector 20 that permits the modem card 16 to be detachably connected to a connector 22 in the computer 18. For instance, PC cards typically employ a 68-contact, dual row pin and socket connector while an Express Card typically employs a 26-contact beam on blade connector. The computer 18 can optionally include a port or a slot configured to receive all or a portion of the modem card 16. The connector 22 can be positioned in the port or slot such that the connector 20 on the modem card 16 is connected with the connector 22 on the computer 18.

The computer 18 includes a power supply 24 that provides power to electronics 32 in the modem card 16 through the connector 20. For instance, modem cards 16 typically operate at about 5 V or 3.3 V. In some instances, the power supply 24 provides power to the modem card 16 at about 5 V or at about 3.3 V.

The electronics 32 include a processor 34 in communication with a voltmeter 35. The processor 34 can employ the voltmeter to monitor, measure, and/or determine the voltage of the power being supplied to the modem card 16. A suitable processor 34 includes, but is not limited to, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions attributed to the electronics 32 and/or the processor 34. A general purpose processor may be a microprocessor, but in the alternative, the processor may be any conventional processor, controller, microcontroller, or state machine. A processor 34 may also be implemented as a combination of computing devices, e.g., a combination of a DSP and a microprocessor, a plurality of microprocessors, one or more microprocessors in conjunction with a DSP core, or any other such configuration.

The electronics 32 include a transceiver 36 in communication with an antenna 37. The processor 34 is in communication with the transceiver. The processor 34 can employ the transceiver 36 to wirelessly transmit signals to the communications system 14 and to wirelessly receive signals from the communications system 14. As an alternative to the transceiver 36, the electronics 32 can be in communication with a receiver and a transmitter.

The electronics 32 include a memory 38 in communication with the processor 34. The electronics 32 can store data for communicating with the communications system 14 in the memory 38. For instance, a maximum transmit power can be stored in the memory. The memory 38 can be any memory device or combination of memory devices suitable for read/write operations.

In some instances, the electronics 32 include a computer-readable medium 40 in communication with the processor 34. The computer-readable medium 40 can have a set of instructions to be executed by the processor 34. The processor 34 can execute the instructions such that the electronics 32 perform desired functions such as executing a request for packet a data service originated by the user. Although the computer-readable medium 40 is shown as being different from the memory, the computer-readable medium 40 can be the same as the memory 38. Suitable computer-readable media 38 include, but are not limited to, optical discs such as CDs, magnetic storage diskettes, Zip disks, magnetic tapes, RAMs, and ROMs.

During operation of the modem card, the modem card communicates with the communications system. Communication with the communications system can include the modem transmitting signals to the communications system and receiving signals from the communications system. During communication with the communications system, the communications system may determine that the signals transmitted by the computer are undesirably weak. In response, the communications system sends the computer a signal requesting that the modem card increase the transmit power for the signals transmitted from the modem card. The transmit power is the signal power at the output of the antenna 37 is typically measured in units such as dBm or watts.

Figure 2:
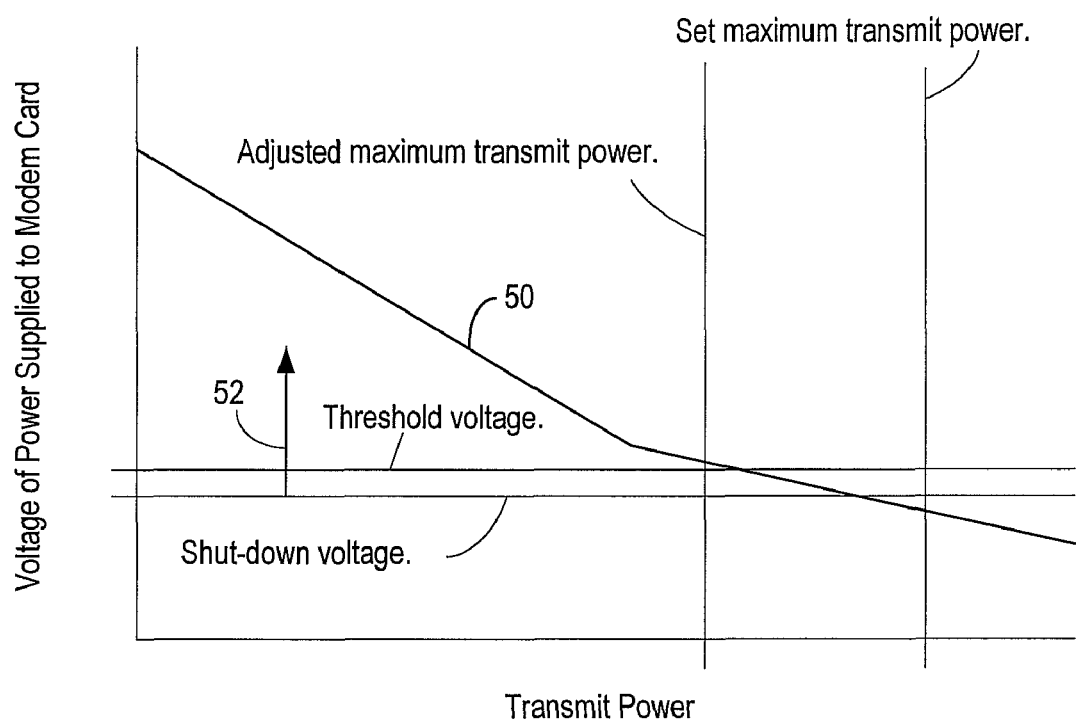
FIG. 2 is a graph illustrating a hypothetical relationship between the transmit power of the wireless signals and the voltage of the power that the computer supplies to the modem card.

Increasing the transmit power can cause a drop in the voltage of the power supplied to the modem card. For instance, FIG. 2 is a graph illustrating a hypothetical relationship between transmit power and the voltage of the power supplied to the modem card (supplied voltage). The transmit power is shown on the x-axis of FIG. 2. The supplied voltage is shown on the y-axis of FIG. 2. Curve 50 in FIG. 2 shows the supplied voltage decreasing as the transmit power increases. As a result, the communications system requesting that the modem card increases the transmit power can cause a drop in the voltage supplied to the modem card.

A set maximum transmit power is labeled in FIG. 2. The "set maximum transmit power" is typically set before the modem card is commercially available. For instance, the "set maximum transmit power" is typically programmed into the electronics by the manufacturer of the modem card or the manufacturer of the electronics. As a result, the set maximum transmit power is not calculated by the electronics. During operation of the modem card, the transmit power can be increased to a maximum transmit power. At one or more times during the operation of the card, the card may be asked to increase the transmit power to the set maximum transmit power. However, as is evident from FIG. 2, increasing the transmit power to the set maximum power can cause the voltage to drop below a shut-down voltage that is also labeled in FIG. 2. The reason for this voltage drop involves how the notebook system is designed. For example, PCMCIA specs call for 3.3V supply that supports up to 1 amp current draw. However, the supply for some notebooks falls below the 3.3V specification at a 1 amp current draw. When the voltage falls below the shut-down voltage, some computers shut down the modem card. Other computers may shut down the computer. For instance, some computers may re-start the computer when the supplied voltage falls below the shut-down voltage. As a result, the communications system requesting that the modem card increase the transmit power can cause the computer to shut down the computer or the modem card. The shut-down voltage varies between notebook designs. For example, notebook computers with a PCMCIA slot and a 3.3V supply, typically have a shut down voltage between 2.7V and 3.0V.

The electronics adjust the value of the maximum transmit power relative to an adjusted maximum transmit power. The electronics determine the adjusted maximum transmit power such that the transmit power does not increase to a level where the supplied voltage falls below the shut-down voltage. For instance, the electronics can initially use the set maximum transmit power as the maximum transmit power and then adjust the maximum transmit power down to a value that is less than or equal to the adjusted maximum transmit power labeled in FIG. 2. The adjusted maximum transmit power is selected such that even when the transmit power is raised to the adjusted maximum transmit power, the voltage does not drop to the shut-down voltage. For instance, the adjusted maximum transmit power of FIG. 2 results in a voltage that is greater than the shut-down voltage.

The electronics can determine the adjusted maximum transmit power using an iterative process. For instance, the electronics can employ a voltage threshold illustrated in FIG. 2. When the electronics responding to requests to increases the transmit power causes the supplied voltage to drop below the voltage threshold, the electronics reduce the transmit power to a revised transmit power. Each time the electronics generate a revised transmit power, the electronics transmit signals at the revised transmit power and determines the voltage of the supplied power that results from transmitting the signals at the revised transmit power. The value of the revised transmit power is repeatedly reduced until one or more of the revised transmit powers results in a supplied voltage that is at least equal to the voltage threshold. The adjusted maximum transmit power is set to a value that is at most equal to the value of one of the revised transmit powers that results in a supplied voltage that is at least such that the supplied voltage is at or above the voltage threshold.

As shown by arrow designation 52 in FIG. 2, the voltage threshold is selected to be greater than or equal to the shut-down voltage. Since the adjusted maximum transmit power results in a supplied voltage that is at or above the voltage threshold and the voltage threshold is greater than or equal to the shut-down voltage, the adjusted maximum transmit power results in a supplied voltage that is greater than or equal to the shut down voltage. Accordingly, the adjusted maximum transmit voltage is selected to reduce events where the computer shuts itself down and/or shuts down the modem card.

The voltage threshold is preferably above the shut down voltage. As is evident from the above description, the supplied voltage can fall below the voltage threshold during the process of determining the adjusted maximum transmit power. In some instances, a voltage threshold above the shut-down voltage may prevent the supplied voltage from falling below the shut-down voltage while determining the adjusted maximum transmit power.

Curve 50 illustrated in FIG. 2 may vary as a result of the outer resources and/or peripherals to which the computer is providing power. For instance, the drop in the voltage supplied to the modem may become more rapid as the computer increases the power supplied to resources and/or peripherals other than the modem card. As a result, the computer can continue to determine a new adjusted maximum transmit power when the communications system requests that the modem card increase the transmit power.

Figure 3:
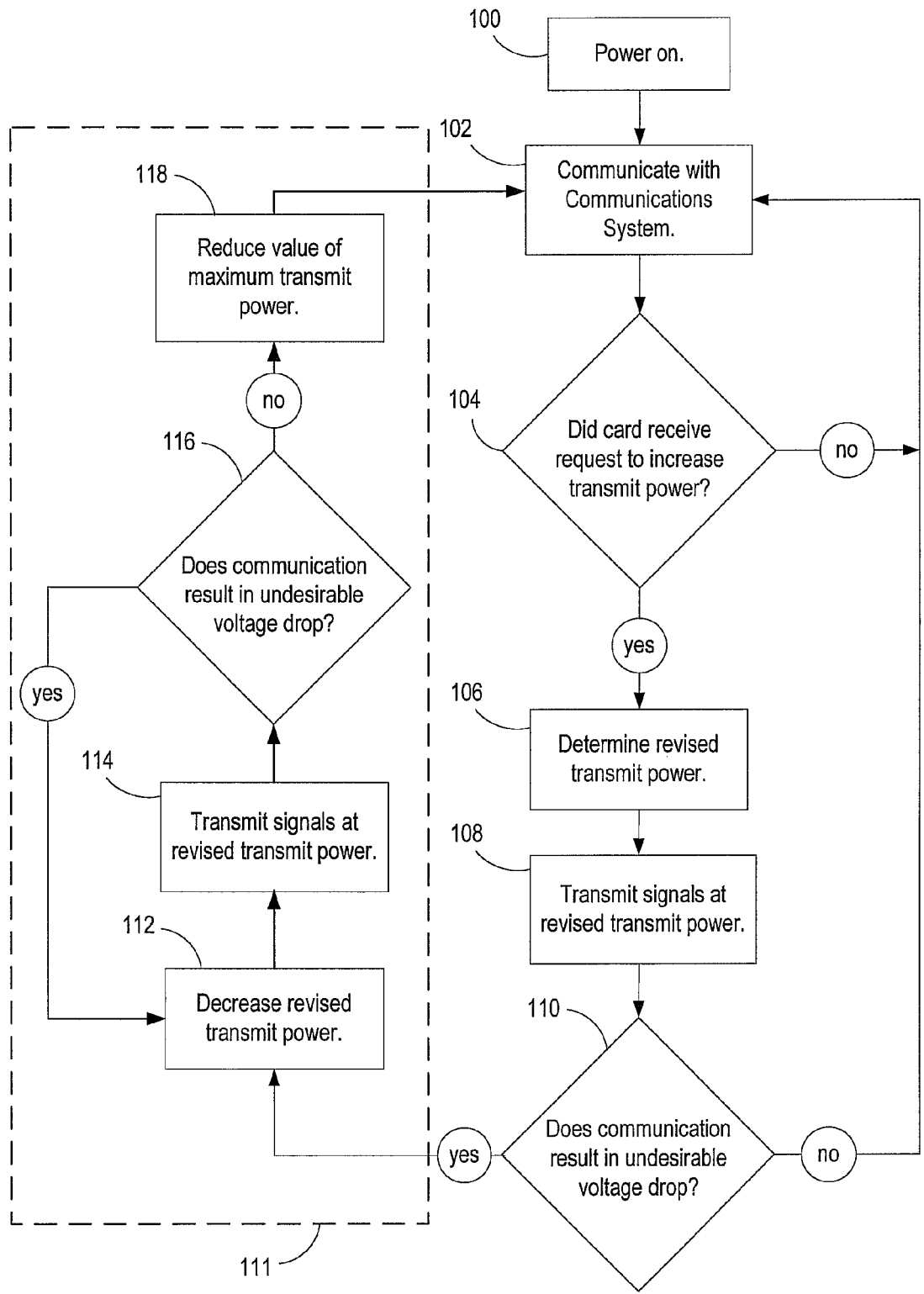
FIG. 3 is a flow chart for a method of operating the modem card.

FIG. 3 is a flow chart for a method of operating a modem card. At process block 100, the power supply in the computer supplies power to the electronics in the modem card. At process block 102 the electronics begin communicating with a communications system. When the electronics proceed from process block 100 to process block 102, an initial transmit power serves as the maximum transmit power for communicating with the communications system. The set maximum transmit power can serve as the initial maximum transmit power. Alternately, a maximum transmit power that was previously determined by the electronics can serve as the initial maximum transmit power.

At determination block 104, the electronics make a determination whether the modem card has received a request for increased transmit power from the communications system. When the determination is negative, the electronics continue communicating with the communications system at process block 102.

When the determination at determination block 104 is positive, the electronics determine a revised transmit power at process block 106. The revised transmit power is determined so as to have a transmit power between the transmit power employed at process block 104 and the maximum transmit power or has a value equal to the maximum power. At process block 108, the modem card transmits signals at the revised transmit power.

At determination block 110, the electronics determine whether transmitting signals at the revised transmit power results in an undesirable drop in the supplied voltage. For instance, the electronics can determine the voltage of the power being supplied to the modem card from the power supply. The electronics can compare the voltage to the voltage threshold. The determination at determination block 110 can be positive when the determined voltage is at or below the voltage threshold and the determination at determination block 110 can be negative when the determined voltage exceeds the voltage threshold.

When the determination at determination block 110 is negative, the electronics returns to process block 102 and continues to communicate with the communication using the revised transmit power and the maximum transmit power that is currently being employed.

When the determination at determination block 110 is positive, the electronics determine the adjusted maximum transmit power at process block 111. Process block 111 includes process blocks 112 where the value of the revised transmit power is reduced. For instance, the revised transmit power can be decreased by a pre-determined increment. At process block 114, the electronics transmit signals to the communications system at the revised transmit power.

At determination block 116, the electronics determine whether transmitting signals at the revised transmit power results in an undesirable drop in the supplied voltage. For instance, the electronics can determine the voltage of the power being supplied to the modem card from the power supply. The electronics can compare the determined voltage to a voltage threshold. The voltage threshold can be the same or different from the voltage threshold of determination block 110. The determination at determination block 116 can be positive when the determined voltage is at or below the voltage threshold and the determination at determination block 116 can be negative when the determined voltage exceeds the voltage threshold. When the determination is positive, the electronics return to process block 112.

When the determination at determination block 116 is negative, the electronics reduce the value of the maximum transmit power at process block 118. For instance, the electronics can treat the revised transmit power as an adjusted maximum transmit power. The electronics can adjust the value of the maximum transmit power to a value that is less than or equal to the adjusted maximum transmit power. In some instances, the electronics adjust the value of the maximum transmit power to a value that is equal to the value of the adjusted maximum transmit power. In the event that the electronics adjust the value of the maximum transmit power to a value that is less than the value of the adjusted maximum transmit power, the electronics can multiply the adjusted maximum transmit power by a factor that is less than 1 or subtract a factor from the adjusted maximum transmit power. The electronics proceed from process block 118 to process block 102 where the electronics communicate with the communications system using the maximum transmit power determined at process block 118.

Each time the electronics adjust the maximum transmit power, the electronics can store the maximum transmit power in the memory. As a result, the electronics can employ the stored maximum transmit power as the initial transmit power each time the computer is powered on without the modem card being removed from the computer, each time that the modem card is used to communicate with the communications system without the computer being shut down, and/or the next time the modem card is used after being removed from the computer. Additionally or alternately, each time the computer is powered on without the modem card being removed from the computer, each time that the modem card is used to communicate with the communications system without the computer being shut down, and/or the next time the modem card is used after being removed from the computer.

All or a portion of the method described above can be executed by the electronics. In some instances, the electronics include a computer-readable medium and instructions for executing all or a portion of the methods disclosed above are included on the computer-readable medium. The processor can execute these instructions during operation of the modem card.

Other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A modem card, comprising:
a connector configured to be connected to a computer;
electronics configured to be powered by power supplied from a power supply located in the computer; and
the electronics being configured to
transmit wireless signals to a communications network, the signals being transmitted at a transmit power,
vary the transmit power such that the transmit power does not exceed a maximum transmit power, the transmit power being varied such that a voltage of the power drops in response to increases in the transmit power,
determine a value for an adjusted maximum transmit power, the adjusted maximum transmit power being a transmit power at which the signals can be transmitted to the communications system without the voltage dropping below a shut-down voltage,
reduce a value of the maximum transmit power to a value that that is less than or equal to the value determined for the adjusted maximum transmit power.

2. The card of claim 1, wherein determining the adjusted maximum transmit power includes:
increasing the transmit power to a revised transmit power where the power falls below a voltage threshold, the voltage threshold being equal to or greater than the shut-down voltage, and the revised transmit power being less than the maximum transmit power;
repeatedly reducing the revised transmit power and transmitting the wireless signals to the communications system using the revised transmit powers,
determining the voltage that results from each revised transmit power, and
treating one of the revised transmit powers that result in a voltage that is at least equal to the voltage threshold as the adjusted maximum transmit power.

3. The card of claim 1, wherein determining the adjusted maximum transmit power includes:
increasing the transmit power to a revised transmit power;
transmitting the wireless signals at the revised transmit power;
determining the voltage that results from transmitting the wireless signals at the revised transmit power; and
determining whether the determined voltage is below a voltage threshold that is at least equal to the shut-down voltage.

4. The card of claim 3, wherein determining the adjusted maximum transmit power includes:
decreasing the revised transmit power in response to determining that the determined voltage is below the voltage threshold.

5. The card of claim 3, wherein determining the adjusted maximum transmit power includes:
treating the revised transmit powers as the adjusted maximum transmit power in response to determining that the determined voltage is at least equal to the voltage threshold.

6. The card of claim 3, wherein
the electronics are configured to receive signals from the communications network; and
increasing the transmit power to a revised transmit power is performed in response to the electronics receiving a signal from the communications network which requests that the electronics increase the transmit power.

7. The card of claim 3, wherein the voltage threshold is equal to the shut-down voltage.

8. The card of claim 3, wherein the voltage threshold is greater than the shut-down voltage.

9. The card of claim 1, wherein a set maximum transmit power is stored in the electronics and is not calculated by the electronics but is used as the maximum transmit power at some time during operation of the card, the adjusted maximum transmit power being determined to have a value that is different from a value of the set maximum transmit power.

10. A computer system, comprising:
a computer having a power supply that provides power having a voltage; and
a modem card removably connected to the computer, the modem card including
electronics powered by the power from the power supply,
the electronics being configured to
transmit wireless signals to a communications network, the signals being transmitted at a transmit power,
vary the transmit power such that the transmit power does not exceed a maximum transmit power, increases in the transmit power causing a drop in the voltage of the power,
determine a value for an adjusted maximum transmit power, the adjusted maximum transmit power being a transmit power at which the signals can be transmitted to the communications system without the voltage dropping below a shut-down voltage,
reduce a value of the maximum transmit power to a value that that is less than or equal to the value for the adjusted maximum transmit power.

11. The system of claim 10, wherein determining the adjusted maximum transmit power includes:
increasing the transmit power to a revised transmit power where the power falls below a voltage threshold, the voltage threshold being equal to or greater than the shut-down voltage, and the revised transmit power being less than the maximum transmit power;
repeatedly reducing the revised transmit power and transmitting the wireless signals to the communications system using the revised transmit powers,
determining the voltage that results from each revised transmit power, and
treating one of the revised transmit powers that result in a voltage that is at least equal to the voltage threshold as the adjusted maximum transmit power.

12. The system of claim 10, wherein determining the adjusted maximum transmit power includes:
increasing the transmit power to a revised transmit power;
transmitting the wireless signals at the revised transmit power;
determining the voltage that results from transmitting the wireless signals at the revised transmit power; and determining whether the determined voltage is below a voltage threshold that is at least equal to the shut-down voltage.

13. The system of claim 12, wherein determining the adjusted maximum transmit power includes:
decreasing the revised transmit power in response to determining that the determined voltage is below the voltage threshold.

14. The system of claim 12, wherein determining the adjusted maximum transmit power includes:
treating the revised transmit powers as the adjusted maximum transmit power in response to determining that the determined voltage is at least equal to the voltage threshold.

15. A method of operating a modem card, comprising:
transmitting wireless signals to a communications network, the signals being transmitted at a transmit power;
varying the transmit power such that the transmit power does not exceed a maximum transmit power, the transmit power being varied such that a voltage of the power drops in response to increases in the transmit power;
determining an adjusted maximum transmit power, the adjusted maximum transmit power being a transmit power at which the signals can be transmitted to the communications system without the voltage dropping below a shut-down voltage; and
changing a value of the maximum transmit power to the value of the adjusted maximum transmit power.

16. The method of claim 15, wherein determining the adjusted maximum transmit power includes:
increasing the transmit power to a revised transmit power where the power falls below a voltage threshold, the voltage threshold being equal to or greater than the shut-down voltage, and the revised transmit power being less than the maximum transmit power;
repeatedly reducing the revised transmit power and transmitting the wireless signals to the communications system using the revised transmit powers;
determining the voltage that results from each revised transmit power; and
treating one of the revised transmit powers that result in a voltage that is at least equal to the voltage threshold as the adjusted maximum transmit power.

17. The method of claim 15, wherein determining the adjusted maximum transmit power includes:
increasing the transmit power to a revised transmit power;
transmitting the wireless signals at the revised transmit power;
determining the voltage that results from transmitting the wireless signals at the revised transmit power; and
determining whether the determined voltage is below a voltage threshold that is at least equal to the shut-down voltage.

18. The method of claim 17, wherein determining the adjusted maximum transmit power includes decreasing the revised transmit power in response to determining that the determined voltage is below the voltage threshold.

19. The method of claim 17, wherein determining the adjusted maximum transmit power includes treating the revised transmit powers as the adjusted maximum transmit power in response to determining that the determined voltage is at least equal to the voltage threshold.

20. A program product for a modem card, the program product comprising:
computer-executable logic contained on a computer-readable medium and configured for causing the following computer-executed operations to occur:
transmitting wireless signals to a communications network, the signals being transmitted at a transmit power;
varying the transmit power such that the transmit power does not exceed a maximum transmit power, the transmit power being varied such that a voltage of the power drops in response to increases in the transmit power;
determining an adjusted maximum transmit power, the adjusted maximum transmit power being a transmit power at which the signals can be transmitted to the communications system without the voltage dropping below a shut-down voltage; and
changing a value of the maximum transmit power to the value of the adjusted maximum transmit power.

* * * * *